United States Patent [19]

Kittredge

[11] Patent Number: 4,621,719

[45] Date of Patent: Nov. 11, 1986

[54] DRIVE BASE FOR A POSTAL MAILING SYSTEM

[75] Inventor: Lloyd G. Kittredge, Trumbull, Conn.

[73] Assignee: Pitney Bowes Inc., Stamford, Conn.

[21] Appl. No.: 697,087

[22] Filed: Jan. 31, 1985

[51] Int. Cl.[4] .............................................. F16D 21/00
[52] U.S. Cl. .................................. 192/48.1; 192/48.9; 192/114 R
[58] Field of Search .................... 192/48.1, 48.91, 48.9, 192/93 R, 67 P, 15, 18 R, 114 R; 74/567, 569

[56] References Cited

U.S. PATENT DOCUMENTS

| | | | |
|---|---|---|---|
| 1,693,645 | 12/1928 | Fahrney | 192/48.9 |
| 2,386,541 | 10/1945 | Campodonico | 192/48.9 |
| 2,934,009 | 4/1960 | Bach et al. | 192/81 R |
| 4,425,988 | 1/1984 | Stock et al. | 192/18 R |
| 4,478,320 | 10/1984 | Baba | 192/48.91 |

Primary Examiner—George H. Krizmanich

Attorney, Agent, or Firm—Michael J. DeSha; Albert W. Scribner; William D. Soltow, Jr.

[57] ABSTRACT

A drive base which is utilized in conjunction with a postal mailing system is disclosed. The base comprises a mode selection arrangement which alternately actuates a postage metering unit or a tape drive unit located within a mailing machine. The arrangement also provides a neutral setting for the drive base. Thus, in the neutral position, the drive base prevents the meter unit or the tape drive unit from operating. The mode selection arrangement includes a first cam member for engaging either the metering unit or the tape drive unit for operation. The arrangement also includes a second cam member for preventing one of the units from rotating when the other is engaged. In addition, the second cam member prevents both units from moving when the system is in a neutral position. This base provides a simple apparatus to be utilized for actuating the various portions of a postal mailing system.

8 Claims, 5 Drawing Figures

DRIVE BASE FOR A POSTAL MAILING SYSTEM

FIELD OF THE INVENTION

This invention relates to electronic postal mailing systems and in particular to a drive base utilized in conjunction with a mailing system.

BACKGROUND OF THE INVENTION

A typical electronic postal mailing system is composed of a postage meter and a mailing machine. Within the mailing machine, generally there are apparatus that allow the mailing machine to transport envelopes, and the like to and from the postage meter. In addition, in the mailing machine there is usually a tape making apparatus. There are several types of postal mailing systems that are known and have been described in the art.

Mailing systems also typically have a drive base for initiating the different operations of the printing function of the mailing system. For example, a typical drive base will be able to drive a tape transport system, drive the postage meter and also drive cut-off knives, etc. that are located within the mailing system.

The postage meter is typically controlled by a shutterbar arrangement which is part of the mailing system is typically engaged by the drive base. In addition, locking and unlocking tape drive system of the mailing system is typically utilized.

The drive base normally used in a mailing system utilizes a variety of gears and cams and mechanical parts to accelerate and decelerate a printing drum of a postage meter to control tape making and other functions of the mailing system. Drive systems of this kind generally comprise complex mechanical gear arrangements that transmit the torque of the drive through mechanical linkages and the like. The problems with these kinds of systems are that they often times wear the mechanical parts as the mailing system goes through its different operations. This wear of the mechanical parts reduces the accuracy and efficiency of the mailing system.

Although this drive base performs adequately for its basic function, the multiplicity of mechanical parts creates certain problems within the mailing system. To be more specific, the mechanical parts because of the decelerating and accelerating of the process become worn and the like, thereby reducing the accuracy of the settings. In addition, the acceleration and deceleration mode of the drive base creates noise that does not interfere with the basic function of the drive base but can be annoying in a quiet environment.

Thus, it is important that a drive base be developed that allows for actuation of the various parts of a mailing system with a reduction of accompanying noise. Also, it is important that a drive base be developed that has fewer mechanical parts thereby minimizing the wear thereon and in addition improving the accuracy of the settings of the system. Finally, it is important that a drive base be able to actuate several functions through one motive power source.

Thus, the drive base should be such that it can set the system to a variety of functions (i.e., the meter, a tape transport system, cut-off knife, tape making apparatus) associated with a postal mailing system. Also, the drive base should be able to lock and unlock a tape drive and other associated components of a postal mailing system. Finally, the system should be such that it is economical and efficient and can be utilized in a variety of mailing systems.

SUMMARY OF THE INVENTION

A drive base is disclosed that can be utilized in conjunction with a controlled drive motor. In this illustrative embodiment, the drive base comprises a drive shaft member which includes a mode selection means attached to the drive shaft member. The drive shaft member is continuously in engagement with a motive power source, in this illustrative embodiment that source is a d.c. motor. The d.c. motor is typically programmable; that is, it can be operated to perform different motions by a controller or the like. The d.c. motor actuates the various parts of the mailing system once the mode selection means has been set at its appropriate position. The engaging means is adapted to engage a rotatable meter drive section and/or a rotatable tape drive section of the postal mailing system. The tape drive unit and meter drive unit thereafter engage the gears that actuate the tape drive mechanism and the postage meter drum, respectively.

Attached to the engaging means is a first cam member which rotates to cause the engagement of either the tape drive section or the meter drive section of the postal mailing system with thrive shaft member. The cam is rotated and actuated by a motor, in this illustrative embodiment, a stepper motor. The motor in response to signals from the postage mailing system, causes the rotation of the cam member.

Attached to the first cam member is one end of a rod member. Connected at a point between the first cam member and the motive power means is a second cam member. The second cam member when rotated actuates a locking means that has three positions. The locking means in a first neutral position prevents the rotation of the meter drive unit and the tape drive unit. In a second position, the locking means prevents the tape drive unit from rotating while allowing the meter drive unit to rotate. Finally, in a third position, the locking means prevents the meter drive unit from rotating while allowing the tape drive unit to operate.

This system can be used advantageously with a postage meter. Thus, the drive base system of this embodiment is a three position system (1) which allows for driving a tape system of a postal mailing machine, (2) unlocking the shutter bar and driving a postage meter on a mailing machine and (3) allowing the machine to reside in a neutral position whereby neither tape system nor postage meter can be driven but other functions of the mailing system can be actuated.

This system is a simple one that can be utilized in a postal mailing system. The drive base system can be adapted to either low or high volume mailing applications. Finally, it is a system which greatly reduces many of the frictional forces present in other systems.

DETAILED DESCRIPTION OF THE PREFERRED EMBODIMENT

Except as otherwise provided herein, the instant drive base apparatus may be constructed and arranged into a postal mailing system in manner similar to that of a drive base within presently known postal mailing systems and associated apparatus. Therefore, the following description concentrates on those components of the drive base in their operation which pertain to the invention. The remaining components of the postal mailing system may be conventional and are described in a general manner to show the cooperation they have with the invention.

Figure 1:
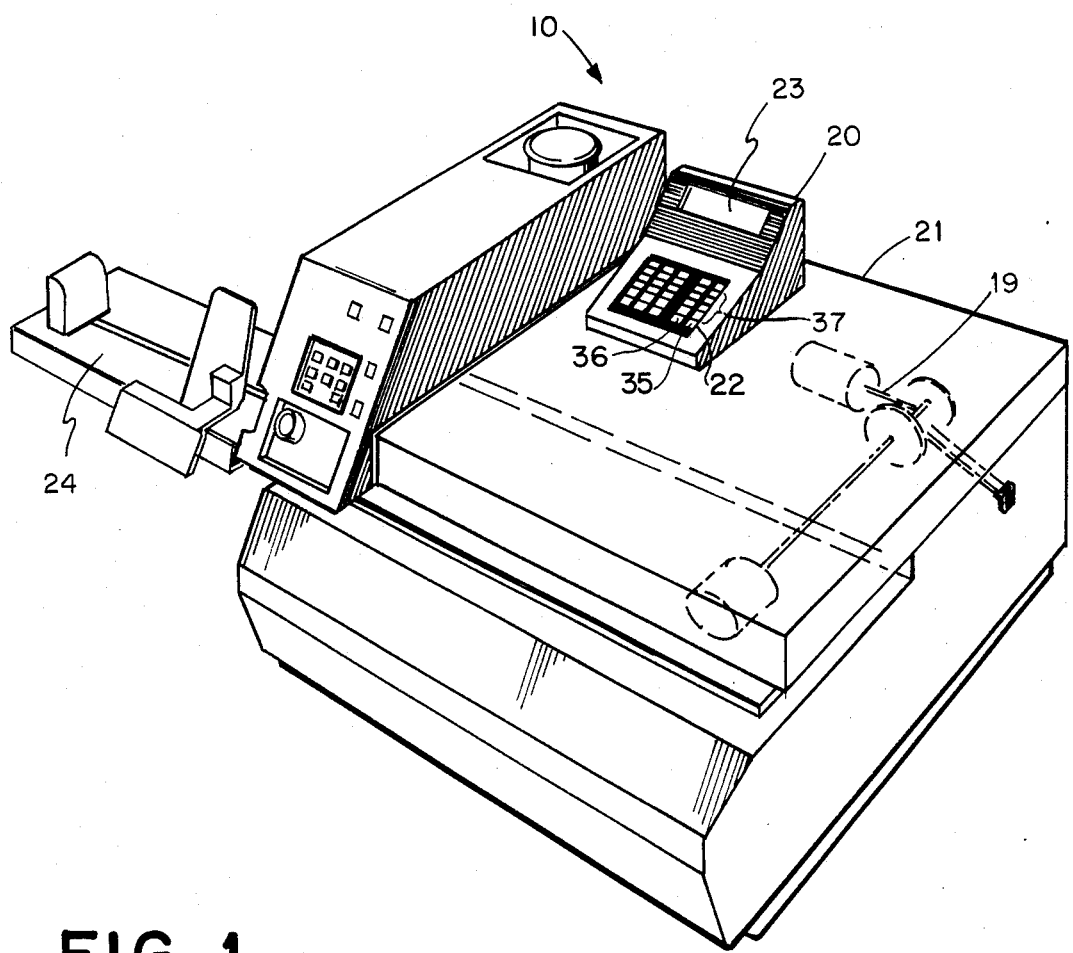
FIG. 1 is a perspective view of a postage mailing system.

FIG. 1 shows a perspective view of mailing system 10. The mailing system 10 comprises a postage meter 20 and a mailing machine 21. The postage meter 20 of this embodiment has a panel 22 at a top portion. The panel 22 contains a set of keys that perform a variety of functions. The postage meter of this embodiment contains ascending and descending registers which perform their normal functions. Thus, printed postage and the descending register will inform an operator of the amount of postage funds still remaining in the meter. Keys 35 and 36 can be utilized to display the amounts respectively on display 23 to allow the operator to monitor those respective values as well as perform other functions. Further, keys 37 may enable, in a conventional manner, other specialized values such as control of postage sum, piece count, batch value and batch count respectively.

Also, the panel can be provided with setting keys and a decimal key operative therewith for setting the meter to print a desired amount of postage, the amount normally being on display 23. When the displayed amount has been set to the desired value, depression of a set postage key affects the setting of the postage meter 20 apparatus. The mailing machine 21 also includes the feeder 24 for separating and feeding the mailpiece associated with the mailing machine 21. Within the mailing machine is tape drive apparatus which provides tape to be imprinted by the meter 20. The tape is typically manually attached to a mailpiece for postal marking particularly in package mailing arrangements.

A drive base system 19 (FIG. 2) is utilized to actuate the postage meter and a tape drive system associated therewith. Previous drive bases for postal systems such as disclosed in U.S. Pat. No. 2,934,009 typically require mechanical arrangements that can sometimes wear out after continual use. Thus, it is important to develop an alternative to previous drive bases that are not as mechanically complex. If the drive base is less mechanically complex, there will be less parts to wear out.

This objective becomes more necessary as postage meters have increasingly utilized electronic controls. In addition, the drive base of this invention can be controlled by a microcomputerized postal system such as that disclosed in U.S. Pat. No. 3,978,457 issued to the assignee of this application. One ordinarily skilled in the art should recognize that it is also possible that the present inventive drive base can be utilized with other mailing systems that have electronic controls associated therewith.

Figure 2:
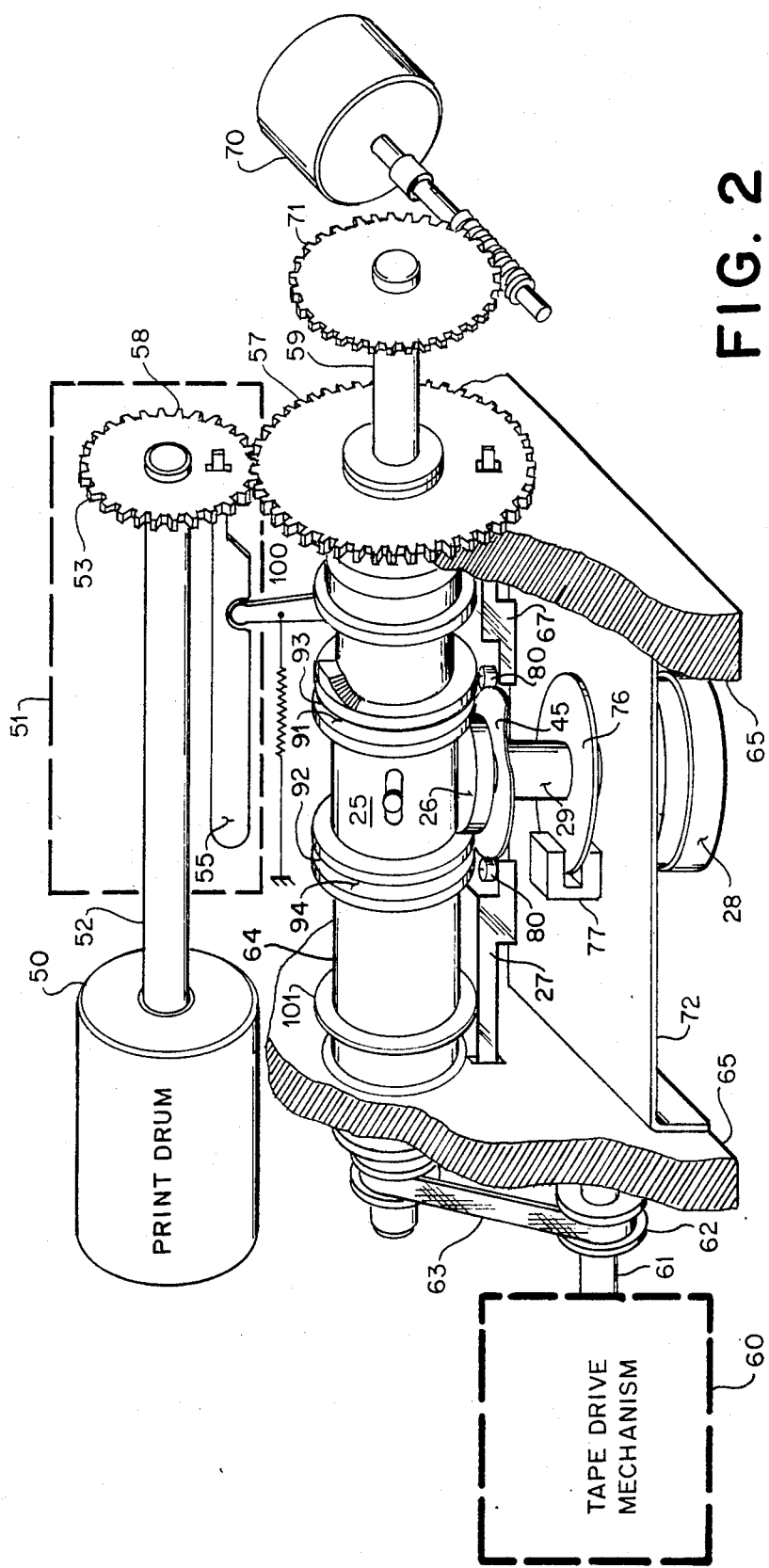
FIG. 2 is a simplified view of the drive base of the mailing system of FIG. 1.

FIG. 2 is a pictorial representation of the drive base system 19 of the subject invention. It should be understood that this drive base could be utilized with a variety of postal mailing systems. For simplicity sake, in this illustrative embodiment many parts that are commonly utilized in such mailing systems have been omitted. Thus, although those parts are not generally disclosed in this specification, one ordinarily skilled in the art could recreate basic parts of a postal mailing systems.

Referring again to FIG. 2, a drive base system 19 is shown interacting with print drum 50 of a postage meter 51 (shown in outline form) and a tape drive mechanism 60. Drive shaft 59 is rotated at one end via its connection to a motive power source 70. As is shown, a gear 71 attached to the drive shaft 59 is engaged with the source 70. The source 70 can take on a variety of forms. For example, it could be a d.c. motor or the like which can be utilized to transmit the power directly.

The drive shaft is thereby continuously in engagement with the source 70 to actuate the meter and tape drive sections 54 and 64 respectively in response to the mode selector 25. The motor 70, in turn, is controlled by circuitry or the like located within the mailing system. Typically, circuitry that controls the motor 70 is disclosed in U.S. patent application Ser. No. 657,695 filed on Oct. 4, 1984 entitled MICROPROCESSOR CONTROLLED D.C. MOTOR FOR CONTROLLING A LOAD in names of W. Kirschner and E. Salazar and assigned to the assignee of this application.

Attached to the stepper motor 28 is a rod member 29 which is connected to an encoder ring 76. The rod member 29 is also connected to first and second cam members 26 and 45. The stepper motor 28 is attached to a base portion 72 of the mailing machine 21. At a point above the motor 28 is an encoder ring 76 that indicates the position of the drive base system 19. As indicated, there is a sensor 77 which has leads (not shown) that allow the circuitry located in the mailing machine to determine the position of the drive base system. Second cam member 45 is engaged with the two locking members 27 and 67 through stops 80. Locking members 27 and 67 prevent rotation of the postage meter unit and tape drive mechanisms, respectively.

Attached to the end of the rod 29 is a first cam member 26. Cam member 26 interacts with the mode selector 25 to facilitate engagement of the selector 25 with the tape drive unit 64 on the meter drive unit 54, respectively.

Thus, in this illustrative embodiment, when cam member 26 is in a first position neither the meter drive unit 54 nor the tape drive unit 64 is engaged. Simultaneously, the cam member 45 is rotated so that both units 54 and 64 are prevented from rotating by locking means members 27 and 67, respectively. Also, the shutter bar actuator 100 is in a locking position with shutter bar arm 55.

When cam member 26 is in a second position, the tape drive unit 64 is engaged to the drive shaft 59 via the mode selector 25 and thereafter the tape drive mechanism 60 is actuated. In addition, locking means 67 is disengaged from the drive unit 64 while simultaneously the locking means 27 preventing the engagement of the drive unit 54 with drive shaft 59.

Finally, when the cam member is in a third position, meter drive unit 54 is engaged with the drive shaft 59 via the mode selector 25. Simultaneously, the shutter bar 100 is withdrawn from slot of shutter bar arm 55. Thereafter gear 58 can rotate the print drum 50 of the postage meter 51. In addition, locking means 27 is disengaged from the unit 54, while simultaneously the locking means 67 prevents engagement of drive unit 64 with drive shaft 59.

In this embodiment, flange portion 91 of the mode selector 25 facilitates engagement of the meter drive unit 54. On the other hand, the flange portion 92 the mode selector facilitates engagement with the tape drive unit 64. Flange 91 engages a detent 93 within meter drive unit 54. The unit 54 in turn will rotate the drive gear 58 of the print drum to facilitate rotation of the print drum 50 which is connected to the drive gear 53 via shaft 52. Flange 92 engages a detent 94 within drive unit 64. The unit 64 will in turn rotate a tape drive belt 63 which turns a gear 62. The gear 62 is connected to shaft 61 which engages the tape drive mechanism 66. The gear member 53 is in this illustrative embodiment locked and unlocked by means of the shutter bar actuator 100.

To more clearly understand the drive base system's interaction, the operation of the drive base system will be described in more detail with the following discussion in conjunction with FIGS. 3, 4 and 5. These figures show in cut-away perspective the components of drive base system and the interaction thereof.

Figure 3:
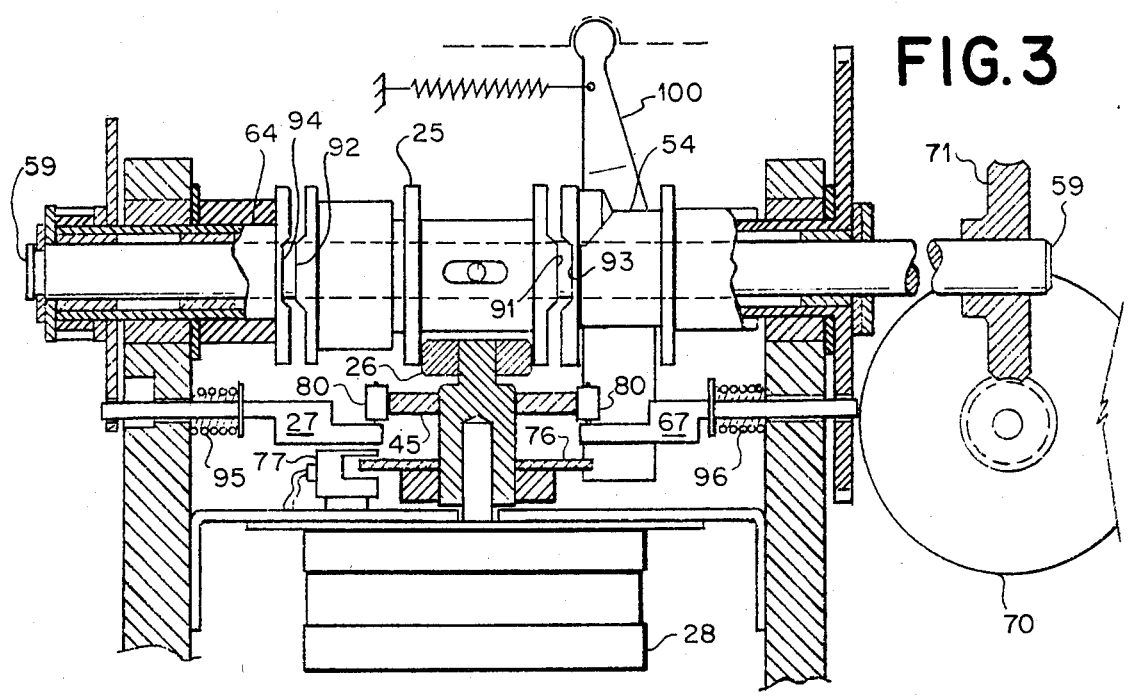
FIG. 3 is a first diagrammatical view of the drive base of the mailing system in a neutral position.

FIG. 3 shows the drive base system in a neutral position. In this position, as is indicated, neither the meter drive unit 54 nor the tape drive unit 64 are engaged. In the neutral position, other functions of the mailing machines can be initiated without engaging the tape drive unit 64 or the meter drive unit 54. As before mentioned, a motor 70 under the control of the mailing system is utilized to initiate the various functions of the printing system. When the printing system is not active, the motor 70 controls the rotation of the drive shaft 59 to operate other functions such as knife cut-off systems (not shown) and the like.

In the neutral position, cam member 26 is rotated by motor 28 so that neither flange member 91 and 92 engage the drive unit detents 93 and 94. Also, as is readily apparent, rollers 80 associated with cam 45 have positioned locking members 27 and 67 such that rotation of drive units 54 and 64 is prevented.

As is seen in the figure, spring members 95 and 96 are in abutment to the locking members 27 and 67, respectively. These spring members 95 and 96 act as compression members to bias the locking members 27 and 67. Encoder ring 76 provides an indication of the location of drive base system 19 through encoder 77. Encoder 77 is preferably an opto-electronic device that is electrically connected to the mailing machine 21 of the mailing system. The encoder 77 provides an indication in response to the control of the mailing system so that motor 28 can turn cams 26 and 45 to their appropriate positions.

Figure 4:
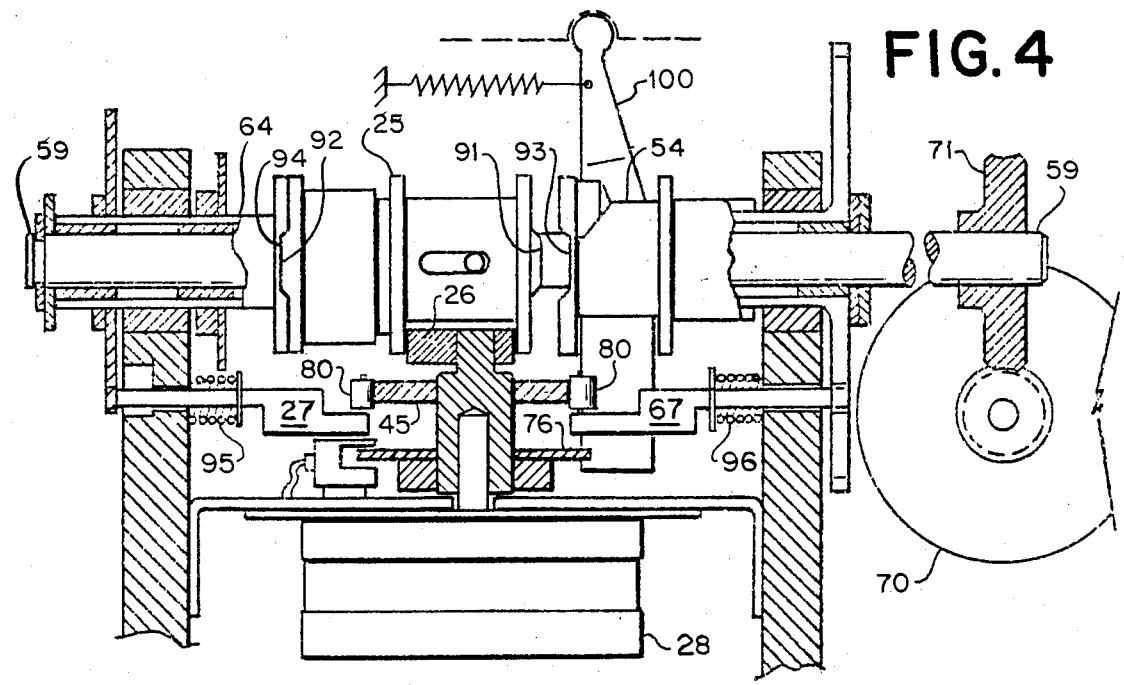
FIG. 4 is a view of the drive base of FIG. 3 with the tape mechanism engaged.

FIG. 4 shows the drive base system 19 with the tape drive unit 64 engaged. As is seen, the flange member 92 of the drive base system 19 has engaged the detent 94 of the tape drive unit 64. In this position, cam member 26 has been rotated so that the tape drive unit 64 is fully engaged. The locking member 67 has been moved by cam member 45 to a position such that the drive 64 can rotate freely. The drive shaft 59 being rotated by motor 70 is engaged with the drive unit 64 to allow for the operation of the tape drive.

In this embodiment, the motor 70 will in effect control how the tape making process occurs via a microprocessor in the mailing system. A typical control system that can be utilized to initiate the tape making process or the postage metering process is described in U.S. patent application Ser. No. 657,651, filed on Oct. 4, 1984 entitled MICROPROCESSOR CONTROLLED D.C. MOTOR FOR CONTROLLING A POSTAGE METER in the names of E. Salazar and Wallace Kirschner to the assignee of this application. This application describes the use of a d.c. motor for the control of the different functions of the printing systems.

As is also seen in the figure, the cam member 45 has pushed locking member 27 into opening 96 in gear 59. Thus, the drive unit 54 is positively prevented from rotation. Thus, in this position, the drive shaft 59 is not engaged with meter drive unit 54 and the meter drive unit 54 is positively locked from rotation by member 27.

Figure 5:
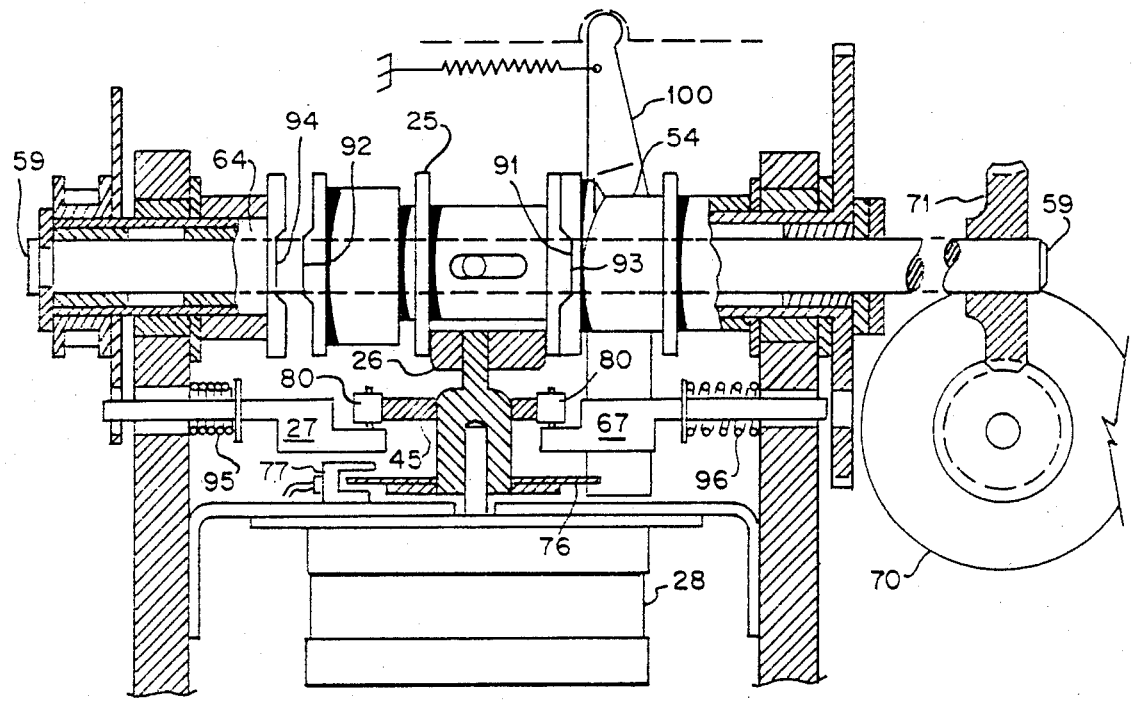
FIG. 5 is a view of the drive base of FIG. 4 with the meter section engaged.

FIG. 5 shows the drive base system 19 with the meter drive unit engaged. As is seen, the flange member 91 has engaged the detent 93 of the meter drive unit 54. In this position, cam member 26 has been rotated so that the meter drive unit is fully engaged. The locking member 27 has been moved by spring 96 against cam member 45 to position such that the drive unit 54 can rotate freely.

The drive shaft 59 being in constant engagement with motor 70 is now also engaged with the drive unit 54 to rotate the print drum 50 of the postage meter 51. The motor 70 will control the postage metering process to produce the appropriate postage imprint dependent upon inputs from the mailing system controls.

As is also seen in the figure, the cam member 45 has pushed locking member 27 into opening 96 in pulley flange on unit 64. Thus, the drive unit 64 is positively prevented from rotation. Thus, in this position, the drive shaft is not engaged with tape drive unit 64 and the tape drive unit 64 is positively locked from rotation by member 67.

The drive base system of this embodiment is a simple one that can be utilized with a programmable or controllable motive power source which can be typically a microprocessor controlled d.c. motor. Finally, the drive base system of this embodiment uses fewer mechanical parts than previous drive bases. The drive can be less expensive to construct and maintain. In addition, decreasing the number of mechanical parts will correspondingly decreasing the number of frictional forces associated therewith.

The above-described embodiment can be modified in a variety of ways and those modifications would still be within the spirit and scope of Applicant's invention. Thus, while this invention has been disclosed by means of a specific illustrative embodiment, the principles thereof are capable of a wide range of modification by those skilled in the art within the scope of the following claims.

What is claimed is:

1. In a postal mailing system including a postage metering device and a mailing machine, a drive base system for engaging the metering device and the printing system of a mailing machine having a printing system, the drive base system comprising:
   a shaft means which is in selectable rotatable engagement with the metering device and the mailing machine,
   a rotatable meter drive section which is selectably engaged at one end of the shaft means,
   a rotatable tape drive section which is selectably engaged at the opposite end of the shaft means,
   means connected to the shaft means for engaging the meter drive section or the tape drive section to the shaft means,
   means for actuating the engaging means, and
   locking means connected to the actuating means which in a first position allows the meter drive section to rotate, in a second position allows the tape drive section to rotate and in a third position prevents rotation of the meter drive section and tape drive section.

2. The drive base of claim 1 in which the actuating means further comprises a first cam assembly.

3. The drive base of claim 1 in which the locking means further comprises a second cam assembly and first and second locking members engaged with the second cam assembly.

4. The drive base of claim 3 in which the first and second cam assemblies are connected to one end of a rod member and the other end of the rod member being connected to means for rotating the rod member.

5. In a postal mailing system including a postage metering device and a mailing machine, a drive base system for engaging the metering device and the mailing machine, the drive base system comprising:
   a shaft means which is in selectable rotatable engagement with the metering device and the mailing machine,
   a rotatable meter drive section which is selectably engaged at one end of the shaft means,
   a rotatable tape drive section which is selectably engaged at the opposite end of the shaft means,
   means connected to the shaft means for coupling the meter drive section or the tape drive section to the shaft means,
   means for actuating the coupling means, and
   a locking cam assembly, the locking assembly in a first position allowing the meter drive section to rotate with the shaft member and preventing the tape drive section from rotating, the locking assembly in a second position allowing the tape drive section to rotate with shaft member and preventing the meter drive section from rotating and the locking assembly in a third position preventing the meter and tape drive sections from rotating.

6. The drive base system of claim 5 in which the coupling means is a first cam assembly.

7. The drive base system of claim 6 in which the locking cam assembly includes first and second locking members.

8. A drive base system that is utilized in conjunction with an electronic mailing system, the drive base system comprising:
   a shaft member, one end which is in rotatable engagement with a motive power source within the mailing system,
   a first drive member which is in selectable engagement with the shaft member,
   a second drive member which is in selectable engagement with the shaft member,
   mode selection means which engages the shaft member with either the first or second drive member,
   an actuating cam assembly rotatably engaged with the selection means for actuating said selection means, said actuating cam assembly having a first position being rotatably engaged with the selection means for actuating the first drive member, the actuating cam assembly having a second position being rotatably engaged with the selection means for actuating the second drive member, and the actuating cam assembly having a third position being rotatably engaged with the selection means for allowing the mode selection means to come to a neutral position in which neither the first drive member nor the second drive member are actuated and,
   a locking cam assembly, the locking assembly in a first position allowing the first drive member to rotate with the shaft member and preventing the second drive member from rotating, the locking member in a second position allowing the second drive member to rotate with shaft member and preventing the first drive member from rotating and the locking assembly in a third position preventing the first and second drive member from rotating.

* * * * *